Feb. 10, 1970

O. S. GRAY 3,494,724

METHOD AND APPARATUS FOR CONTROLLING MICROORGANISMS AND ENZYMES

Filed March 27, 1968

INVENTOR:
OSCAR S. GRAY
BY
Howson & Howson
ATTYS.

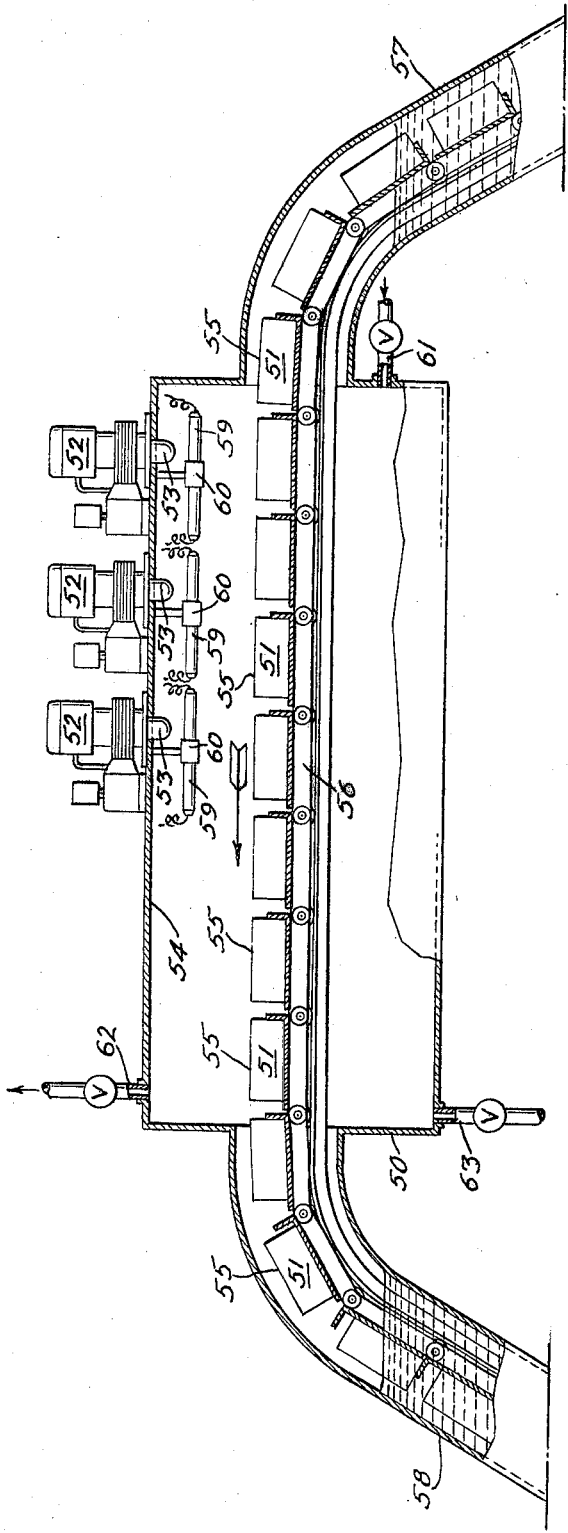

United States Patent Office 3,494,724
Patented Feb. 10, 1970

3,494,724
METHOD AND APPARATUS FOR CONTROLLING MICROORGANISMS AND ENZYMES
Oscar S. Gray, Fort Lauderdale, Fla., assignor to Gray Industries, Inc., Fort Lauderdale, Fla., a corporation of Delaware
Filed Mar. 27, 1968, Ser. No. 716,479
Int. Cl. B65b 55/02, 55/08
U.S. Cl. 21—54                    12 Claims

ABSTRACT OF THE DISCLOSURE

Material containing microorganisms or enzymes is subjected simultaneously to microwave energy and infrared radiation while held in a confined zone permeable to microwave energy and infrared, radiation, through an atmosphere of steam and under superatmospheric steam pressure, said atmosphere of steam being in contact with the exterior of the confined zone, but out of direct contact with said material. There is also provided apparatus embodying means for directing microwave energy, infrared radiation and steam toward the confined zone containing the material to be treated.

Background of the invention

There have been suggestions for using electromagnetic energy, including microwave energy and infrared radiation, to preserve or sterilize certain materials or to otherwise affect microoganisms and enzymes (see, for example, U.S. Patents 2,107,830; 2,133,203; 2,233,815; 2,576,862; 2,833,657; and 3,215,539; Industrial Microwave News, November 1963; German Patent 901,840 and Danish Patent 80,930).

In my U.S. patent 3,092,503 is disclosed and claimed the method of sterilizing edible perishable material having an aqueous base by subjecting it, while held in a confined zone boundaries of which are permeable to infrared radiation, to infrared radiation through an atmosphere of steam under superatmospheric steam pressure.

A recent significant advance in the art of sterilizing is the subject matter of my copending application Ser. No. 649,640 filed June 28, 1967 (as a continuation-in-part of application Ser. No. 345,625 filed Feb. 18, 1964 and now abandoned) which involves the use of microwave energy and steam.

It is the principal object of the present invention to provide a novel improved method for controlling microorganisms and enzymes in material containing them utilizing microwave energy and infrared radiation.

It is another principal object of the present invention to provide a novel improved method of sterilizing.

A specific object of the present invention is to provide a novel method for sterilizing dry material.

A further object of the present invention is to provide a novel apparatus whereby the foregoing objects may be realized.

Other objects will become apparent from a consideration of the following specification and the claims.

Summary of the invention

The method of the present invention comprises in the control of substances causing deterioration selected from the group consisting of microoganisms and enzymes in material containing them by subjecting said material to microwave energy until the desired control is achieved, the improvement wherein the material is subjected in a treating zone and while contained in a confined zone within said treating zone at least one wall of which confined zone is permeable to microwave energy and infrared radiation, simultaneously to microwave energy and infrared radiation through an atmosphere of steam under superatmospheric steam pressure until said control is acheived, said steam atmosphere being in direct contact with walls of said confined zone but out of direct contact with said material undergoing treatment, and then discontinuing the passage of microwave energy and infrared radiation into said material in said confined zone.

The present invention may be employed simply to arrest the growth of microoganisms or reduce their number short of complete destruction, referred to herein as pasteurization or partial sterilization; or to destroy all the microorganisms, referred to herein as sterilization; or simply to deactivate enzymes in a material essentially free of microorganisms. Deactivation of enzymes may take place along with pasteurization or sterilization. The present invention is particularly adapted to the sterilization of dry solid materials, wherein the microorganisms are in a dry state, such as surgical instruments and supplies, glassware, space vehicle components, and the like.

In a specific preferred embodiment of the method, the confined zone containing the material to be treated is a sealed package thereof, at least one wall of which is permeable to microwave energy and infrared radiation. In a further specific preferred embodiment of the method, the confined zone is a tubular pathway, walls of which are permeable to microwave energy, through which a flowable material may be forced for treatment, and after which the material may be aseptically filled into sterile containers which are then sealed.

The novel apparatus of the present invention comprises a chamber, microwave energy generation means adapted to direct microwave energy into said chamber, infrared radiation generating means adapted to direct infrared radiation in said chamber, means for admitting to and removing the material, in a confined zone, from said chamber, means for holding said material in said chamber in a position to receive said microwave energy and infrared radiation and means for admitting steam to said chamber under superatmospheric pressure to said chamber.

In a specific preferred embodiment of the apparatus the means for admitting and removing the material, in this case flowable material, as well as the means for holding the material in the chamber, are tube means, walls of which are permeable to microwave and infrared energy. In a further specific preferred embodiment, primarily adapted for the treatment of a plurality of sealed packages of material in a continuous manner, said chamber is enlarged to hold a plurality of packages at one time and the means for holding the packaged material is a moving surface, such as an endless belt, for moving the packages into, through and out of the chamber.

Brief description of the drawings

The present invention will be more readily understood from a consideration of the drawings in which:

FIGURE 4 is a side elevational view, partly in section, of apparatus that may be used according to the present invention, especially for the treatment of a plurality of packages of material in a continuous manner.

Figure 1:
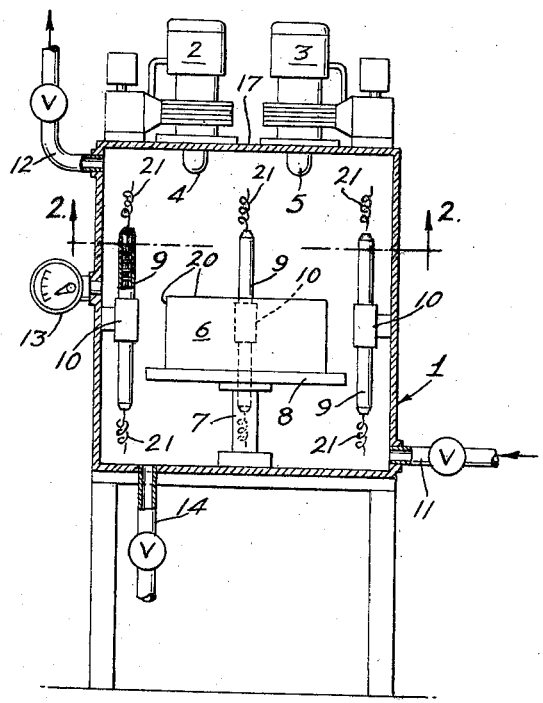
FIGURE 1 is a side elevational view, partly in section, of one form of apparatus that may be used according to the present invention, especially for the treatment of sealed packages of material.
Figure 2:
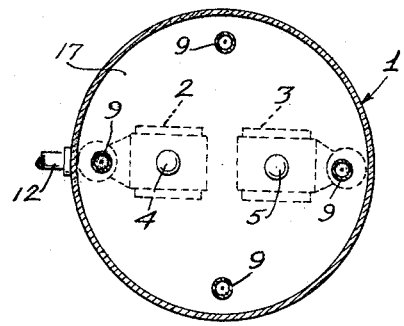
FIGURE 2 is a plan sectional view of apparatus shown in FIGURE 1 as seen from line 2—2.

The present invention is based upon the discovery that microwave energy and infrared radiation coact synergistically, through the superatmospheric steam atmosphere, to provide a substantially more powerful means for powerful means for controlling microorganisms than either form of energy alone, through an atmosphere of steam, or steam alone. This is illustrated by the following tests in which eight different systems of bacteria spores were subjected to various treatments. *Bacillus globigii* and *Bacillus stearothermophilus* were chosen as being generally recognized to be, of the known forms of microbial life, the most resistant to heat, requiring up to 30 minutes exposure to steam at 15 p.s.i. gauge (121° C.) for complete kill. The eight systems were as follows:

(1) *Bacillus globigii* spores suspended in distilled water.

(2) *Bacillus globigii* spores desiccated from a distilled water suspension.

(3) *Bacillus globigii* spores suspended in 10% saline solution.

(4) *Bacillus globigii* spores desiccated from 10% saline solution.

(5) *Bacillus stearothermophilus* spores suspended in distilled water.

(6) *Bacillus stearothermophilus* spores desiccated from a distilled water suspension.

(7) *Bacillus stearothermophilus* spores suspended in 10% saline solution.

(8) *Bacillus stearothermophilus* spores desiccated from 10% saline solution.

The systems were placed in glass test tubes, stoppered with plastic caps and sealed with autoclave tape.

The liquid systems in each tube were about 10 cc., with $10^6$–$10^7$ spores per cc., and the desiccated systems in each tube were desiccated from 10 cc. liquid containing $10^6$–$10^7$ spores per cc.

Each system was subjected to three different treatments for periods of 1, 2, 3, 4 and 5 minutes as follows:

(A) Infrared radiation (from three 500 watt infrared lamps located around test tube 120° apart) plus steam at 9–10 p.s.i. gauge.

(B) Microwave energy (from a 1 kw. magnetron connected to a 220 volt source of alternating current, delivering microwave energy at 2450±25 megacycles at a wave length of about 4.8 inches) plus steam at 9–10 p.s.i. gauge.

(C) Infrared radiation (as in A) plus microwave energy (as in B) plus steam at 9–10 p.s.i. gauge.

The results were as follows:

Treatment A.—None of the systems was sterile after 1 or 2 minutes. After 3 minutes two of the systems (numbers 3 and 4) were sterile. The remaining systems were not sterile after 5 minutes.

Treatment B.—None of the systems was sterile after 1 minute. After 2 minutes, one of the systems (number 5) was sterile. After 3 minutes, two more systems (numbers 1 and 8) were sterile. After 4 minutes, one other system (number 3) was sterile. After 5 minutes, three more systems (numbers 2, 4 and 6) were sterile. No result was obtained with system 7 due to a testing error.

Treatment C.—None of the systems was sterile after 1 minute. After 2 minutes, one system (number 1) was sterile. After 3 minutes, four more systems, (numbers 2, 3, 4 and 8) were sterile. After 4 minutes, one more system (number 6) was sterile. No results were obtained with systems 6 and 7 due to testing errors.

As is well known microwave energy is the electromagnetic wave energy of a wave length falling in the microwave region of the electromagnetic spectrum. The Federal Communications Commission has presently set aside, for microwave processing, bands of microwave energy within the range of between about 400 and about 20,000 megacycles per second with a wave length ranging from about 13 inches for the lower frequencies to about .7 inch for the highest frequencies; specifically: frequencies of about 890–940 with a wavelength of about 13 inches, frequencies of about 2300–2500 with a wave length of about 4–5 inches, and frequencies of 17,850–18,000 with a wave length of about 0.7 inch. The presently preferred microwave energy for use according to the present invention is an intermediate range having a frequency from about 1000 to about 5000, more particularly from about 2000 to about 30,000 megacycles per second. Microwave energy is generated from a suitable high frequency source, such as a magnetron. The generation and use of microwave energy by itself is well known since such has been used for many years in the cooking of food.

Referring to FIGURE 1, 1 represents the treating chamber or zone constructed to withstand the steam pressure that may be employed. Conventional magnetrons 2 and 3, provided with antennae 4 and 5, respectively, are arranged and adapted to direct microwave energy into chamber 1 and, hence, into the package (container) 6 to be treated. The top of chamber 1 defining platform 17 holding magnetrons 2 and 3 may be detachable from the bottom portion to provide means for admitting and removing the material to be treated. Infrared radiation means, 9, are provided, and these may be mounted on the wall of chamber 1, by brackets 10, to direct infrared radiation into package 6. Infrared radiation means 9 may be conventional infrared lamps, or, as shown, bars (tubes) such as fused quartz tubes containing a tungsten filament. The upper portion of one tube 9 is in section to illustrate the tungsten filament inside the tube provided with suitable spacer discs to keep the filament in the center of the tube. Each tube is connected to an appropriate source of electrical power (not shown) by way of leads, such as 21. Chamber 1 may be provided with a door, not shown. Package 6, at least the walls, 20, of which are permeable to microwave and infrared energy, is held in any suitable manner to receive the microwave energy from magnetrons 2 and 3 and the infrared radiation from bars 9, as by rack 7 the platform 8 of which is preferably a rigid plastic material, like polymethylmethacrylate.

Steam under pressure may be admitted to pressure chamber 1 through valved-conduit 11, while purging gases and excessive pressure may be relieved and vented from chamber 1 through valved-conduit 12. The valves employed may be conventionally constructed to control the steam pressure within chamber 1 at a predetermined level. A conventional steam pressure gauge 13 notes the pressure within chamber 1. A valved conduit 14 may be provided to serve as a drain.

In practicing the invention according to FIGURE 1, the package or container 6 to be treated is placed in chamber 1 and the steam under pressure is admitted until the desired pressure is reached in chamber 1. Magnetrons 2 and 3 and infrared bars 9 are turned on for the time required, and then turned off.

Figure 3:
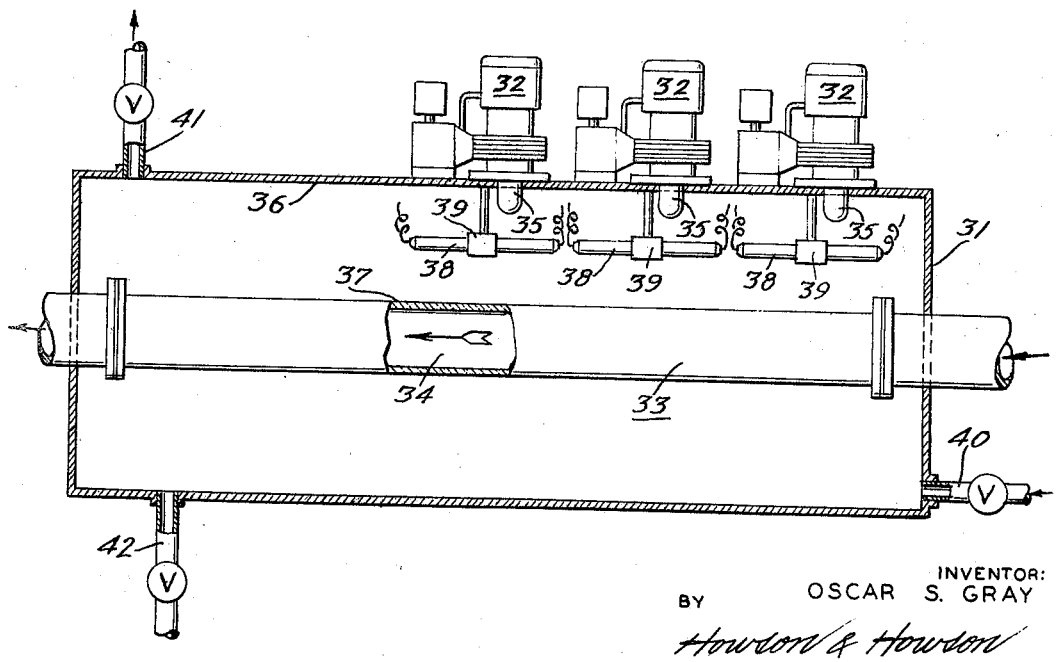
FIGURE 3 is a side elevational view, partly in section, of apparatus that may be used according to the present invention, especially for the treatment of flowable material.

FIGURE 3 illustrates treatment of flowable material in apparatus especially adapted therefor. In this case treating chamber or zone 31 is somewhat elongated and provided with a plurality of magnetrons 32 and infrared bars 38, the number of each of which may be dictated by the length of the confined path, such as tube 33, and the velocity at which flowable material 34 flows therethrough. Tube 33 may be of material permeable to microwave and infrared energy, such as glass, borosilicate type glass or quartz. Magnetrons 32 and their associated antennae 35 may be supported, as by plate 36 of aluminum, for example, so as to direct microwave energy through the wall 37 of tube 33 and into material 34. Likewise, infrared bars 38 may be supported as by brackets 39 so as to direct infrared radiation, along with the microwave energy through the wall 37 of tube 33 and into material 34. Steam under pressure is admitted to chamber 31 through valved conduit 40, vent 41 and drain 42 being provided as in connection with FIGURE 1.

In operation according to FIGURE 3, the operation of magnetrons 32 and of infrared bars 38 is continuous so long as material 34 is flowed through tube 33. The flow velocity of material 34 may be adjusted to provide, with the amount of microwave energy and infrared radiation generated, a residence time within chamber 31 adequate to treat each increment of material 34 in its passage through the treatment zone. Flowable material 34 may be forced into and through tube 33 by a pump or by screw means in the case of materials having a high solids content. The treated material leaving chamber 31 may be aseptically filled into sterile containers and sealed.

While FIGURE 3 illustrates a single tube, it will be apparent that a plurality of tubes may be present in a single chamber. Likewise, while FIGURES 1 and 3 illustrate a single chamber, it will also be obvious that a plurality of chambers may be employed. For example, a plurality of units may be arranged on a rotatable table on which at one station, a unit is filled with the material to be treated, the unit then being moved during the course of treatment to a final station at which the material is removed from the unit.

FIGURE 4 illustrates the treatment of a plurality of containers in a continuous manner. In this embodiment treating chamber or zone 50 is elongated to accommodate a plurality of aligned containers 51. A plurality of magnetrons 52, with associated antennae 53, is provided to provide the requisite microwave energy. Magnetrons 52 are supported, as by plate 54, so as to direct microwave energy toward and into containers 51. A plurality of infrared bars 59 is provided, supported as by brackets 60, to provide the requisite infrared radiation and to direct infrared radiation toward and into containers 51. At least the wall of the container facing the source of the microwave energy and the source of the infrared radiation—in this case wall 55—will be permeable to microwave energy and infrared radiation. Containers 51 are supported in this embodiment on a moving surface, shown as endless belt 56, adapted to move the containers into, through and out of chamber 50. Escape of steam from chamber 50 may be prevented by conventional sealing means, such as water-legs 57 and 58, respectively. Containers 51 move from right to left so that the latter stage of their movement is out of the field of direct irradiation. Submersion of the containers in the water of water-leg 58 serves to cool them.

Steam under pressure is admitted to chamber 50 through main valved conduit 61, vent 62 and drain 63 being provided as in FIGURES 1 and 3.

Operation according to FIGURE 4 is much like that according to FIGURE 3 with the flow of steam and operation of the magnetrons and infrared bars continuing as long as containers of material to be treated are moving through the treating chamber. The number and size of magnetrons and of infrared bars and velocity of the movement of the containers through the chamber may be adjusted to provide a residence time for each container sufficient to result in the desired treatment of the contents thereof.

In designing and operating apparatus according to the present invention, consideration will be given to providing matched load conditions as is known to those familiar with microwave processing.

As will be seen from the foregoing, an essential feature of the present invention is holding the material being treated in a confined zone during the treatment. The walls of the confined zone may be conventional substantially gas-impermeable packaging materials like glass, methylmethacrylate, polystyrene and polyethylene, as in bottles, jars, flasks and tubes; sheets, especially thermoplastic, heat-sealable films like polyvinylidene chloride, polyethylene terephthalate, copolymers of vinylidene chloride and vinyl chloride, polyethylene, cellophane, plastic-coated paper and cardboard, and the like. Part of the container may be of material impermeable to microwave energy, like aluminum foil and steel (as in a "tin" can) so long as the wall of the container facing the source of microwave energy is permeable thereto. For example, the container for the material being treated may be an aluminum foil tray with a film of microwave permeable film as a cover. Or, as in the case of sterilization in conjunction with canning, the container may be a can the open top of which is covered with, say, a polymethylmethacrylate or glass plate through which the microwaves may travel. The confined zone will be substantially gas tight. It will be seen that FIGURES 1 and 4 illustrate the containers schematically and these may be in any form, such as bottles, jars, flasks, cans, trays, pouches, envelopes, boxes and the like.

The pressure of the steam in the treating zone will, as stated, be above atmospheric. The particular pressure employed may depend upon the strength of the walls of the confined zone containing the treated material since one of its functions may be to prevent rupturing of the walls through increase in internal gas pressure. Pressures as low as 0.5 p.s.i.g. have been used and pressures as high as 50 p.s.i.g. may be desirable. In general, pressures from about 2 to about 40 p.s.i.g. have been found to be particularly suitable.

The precise time of treatment according to the present invention will depend upon the ultimate temperature to be reached by the particular material undergoing treatment, which may, in turn, depend upon the nature of the treatment desired, i.e., pasteurization, sterilization or deactivation of enzymes and the nature of the material and the microorganisms and/or enzymes therein as well as upon the side and initial temperature of the mass of the material being treated, and other variable factors which control the flow of heat and the heating of a particular material from one temperature to another. Obviously, therefore, it is not possible to state a range of temperatures and times which will be applicable for all materials, treatments and embodiments of apparatus design. In any event, the time of treatment will be that resulting in the desired level of control of the microorganisms and/or enzymes in the particular material. In other words, in the case of sterilization, the minimum time is dictated by the reduction of the microorganism count to zero; in the case of pasteurization the time is dictated by reduction of the microorganism count to the desired level, and in the case of enzyme deactivation the time is dictated by deactivation of the enzyme. This can be determined by routine conventional microorganism (bacteria and fungi) count tests and enzyme deactivation tests. In the case of organic materials of natural origin which themselves deteriorate through the action of such microorganisms and/or enzymes, it is probably more satisfactory in view of the many variables involved, particularly in the nature of the materials treated, to subject samples of the particular treated material to accelerated incubation tests to arrive at the precise conditions preferred for that material.

The present invention is applicable to the pasteurization, sterilization or enzyme deactivation of all types of materials. This includes foodstuffs which are perishable, that is, which are subject to deleterious change by the action of microorganisms (bacteria and/or fungi) or enzymes and which contain moisture. The food may range in consistency from thin liquids to solids. Examples of such foodstuffs are milk (whole milk, homogenized whole milk, skimmed milk, concentrated milk and the like milk products); fruit and vegetable juices (including juice concentrates); beer, wine and other manufactured beverages, like "soft" drinks, soups; grains, like raw or cooked corn, and cooked rice; vegetables; fruit; stews; soups; meat, including fish and poultry; eggs, pastries;

bread; sandwiches; and the like. The food as treated may be raw, cooked (including baked) or partially cooked. Also applicable are materials which although they are organic materials of natural origin like the foodstuffs mentioned above, are not normally considered edible, such as blood (whole, plasma or serum), tobacco, and the like but which, nevertheless, are subject to deterioration by the action of microorganisms or enzymes. Also included are materials like pharmaceuticals which, whether essentially organic or inorganic, are subject to such deterioration or may serve as carriers of undesirable microorganisms. With such materials, both edible and inedible, the principal result of treatment by the present invention is preservation in packaged form. Also included are materials which, although deterioration thereof is not a principal problem nevertheless act as carriers for microorganisms which can contaminate other materials or living bodies and which are, therefore, desirably sterilized. Most notable in this group are materials used in the practice of medicine, like instruments; textiles, such as surgical wearing apparel, towels and bed linen; surgical gloves, and the like. It will be apparent from the foregoing that the object of the treatment may be the sterilization of the inside of an "empty" sealed container. Here, of course, the material being treated is the air or other gas within the container and the interior surfaces themselves.

I claim:

1. In the control of substances selected from the group consisting of microorganisms and enzymes in material containing them by subjecting said material to electromagnetic energy until the desired control is achieved, the improvement wherein the material is subjected, in a treating zone and while contained in a confined zone within said treating zone at least one wall of which confined zone is permeable to microwave energy and infrared radiation, simultaneously to microwave energy and infrared radiation through an atmosphere of steam under superatmospheric pressure, until said control is achieved. said steam atmosphere being in direct contact with walls of said confined zone but out of direct contact with said material undergoing treatment, and then discontinuing the passage of microwave energy and infrared radiation into said material in said confined zone.

2. The method of claim 1 wherein the microwave energy has a frequency of from about 1000 to about 5000 megacycles per second.

3. The method of claim 1 wherein the microwave energy has a frequency of from about 2000 to about 3000 megacycles per second.

4. The method of claim 1 wherein said material being treated is substantially free of moisture.

5. The method of claim 1 wherein said confined zone is a sealed container and wherein the material undergoing treatment in the confined zone is the gas atmosphere within the container and the interior walls of the container.

6. The method of claim 1 wherein said material contains microorganisms, and wherein it is subjected to said microwave energy and said infrared radiation through said atmosphere of steam until sterile.

7. In the control of substances selected from the group consisting of microorganisms and enzymes in material containing them by subjecting said material to electromagnetic energy until the desired control is achieved, the improvement wherein the material is subjected in a treating zone and while packaged in a container within said treating zone at least one wall of which container is permeable to microwave energy and infrared radiation, simultaneously to microwave energy and infrared radiation through an atmosphere of steam under superatmospheric pressure until said control is achieved, said steam atmosphere being in direct contact with walls of said container but out of direct contact with said material, and thereafter discontinuing the passage of microwave energy into said material.

8. In the control of substances selected from the group consisting of microorganisms and enzymes in liquid and semi-liquid perishable material containing them by subjecting said material to electromagnetic energy until the desired control is achieved, the improvement wherein said material is flowed along a confined pathway, walls of which are permeable to microwave energy, and infrared radiation in a treating zone; and wherein said material while in said confined pathway is subjected simultaneously to microwave energy and infrared radiation through an atmosphere of steam under superatmospheric pressure, said steam atmosphere being in direct contact with walls of said confined pathway but out of direct contact with said perishable material, until said control is achieved, and thereafter discontinuing the passage of microwave energy and infrared radiation into said material.

9. In the control of substances selected from the group consisting of microorganisms and enzymes in material containing them by subjecting the material to electromagnetic energy until the desired control is achieved, the improvement wherein the material, packaged in a plurality of individual containers at least one wall of each of which is permeable to microwave energy and infrared radiation, is moved through a microwave and infrared-treating zone; and wherein the material in said moving container in said treating zone is subjected simultaneously to microwave energy and infrared radiation through an atmosphere of steam under superatmospheric pressure until said control is achieved, said steam atmosphere being in direct contact with walls of said containers but out of direct contact with said material, and thereafter removing said containers from said microwave treating zone.

10. Apparatus for controlling microorganisms and enzymes in material containing them which comprises a chamber; microwave energy generation means adapted to direct microwave energy into said chamber; infrared radiation generating means adapted to direct infrared radiation into said chamber; means for holding the material to be treated in a confined zone, in said chamber in a position to receive said microwave energy and infrared radiation; and means for admitting steam to said chamber under superatmospheric pressure for contact with walls of said confined zone containing said material while remaining out of contact with said material within said confined zone.

11. Apparatus for controlling microorganisms and enzymes in flowable liquid and semi-liquid materials which comprises a chamber; means for moving said material within a confined path within said chamber which means include a wall permeable to microwave energy and to infrared radiation; microwave generating means adapted to direct microwave energy through said wall into said confined path; infrared radiation generating means adapted to direct infrared radiation through said wall into said confined path; means for admitting flowable material to one end of said confined path; means for removing flowable material from the other end of said confined path; and means for admitting steam to said chamber under superatmospheric pressure for contact with walls of said confined path while remaining out of contact with said material within said confined path.

12. Apparatus for controlling microorganisms and enzymes in material in a plurality of sealed packages which comprises a chamber; a supporting surface within said chamber adapted for movement through said chamber; means for admitting packages to said chamber and onto said movable supporting surface; means for removing packages from said chamber and said movable supporting surface; microwave generating means adapted to direct microwave energy to said packages on said movable supporting surface; infrared radiation generating means adapted to direct infrared radiation to said packages on said movable supporting surface, and means for admitting steam to said chamber under superatmospheric pressure.

References Cited
UNITED STATES PATENTS

| | | | |
|---|---|---|---|
| 2,576,862 | 11/1946 | Smith et al. | 99—221 |
| 2,585,970 | 2/1952 | Shaw | 99—221 |
| 3,092,503 | 6/1963 | Gray | 21—54 XR |
| 3,166,663 | 1/1965 | Fritz | 219—10.55 |
| 3,215,539 | 11/1965 | Landy | 21—102 XR |
| 3,271,169 | 9/1966 | Baker et al. | 99—221 |
| 3,272,636 | 9/1966 | Fehr et al. | 99—221 |
| 3,365,562 | 1/1968 | Jeppson. | |
| 3,409,447 | 11/1968 | Jeppson | 99—217 X |

MORRIS O. WOLK, Primary Examiner

BARRY S. RICHMAN, Assistant Examiner

U.S. Cl. X.R.

21—93, 94, 102; 99—21, 150, 217, 221, 253; 131—121; 219—10.55

PO-1050
(5/69)

UNITED STATES PATENT OFFICE
CERTIFICATE OF CORRECTION

Patent No. 3,494,724          Dated February 10, 1970

Inventor(s) Oscar S. Gray

It is certified that error appears in the above-identified patent and that said Letters Patent are hereby corrected as shown below:

Column 1, line 32, "2,233,815" should be --2,222,813--; Column 3, lines 6 and 7, "for powerful means" should be deleted; Column 3, line 68, "6" should be --5--; Column 4, line 4, "2300" should be --2400--; Column 4, line 10, "30,000" should be --3000--; Column 6, line 32, "i.e.," should be --(i.e.,--; Column 6, line 33, "enzymes" should be --enzymes)--.

SIGNED AND SEALED
AUG 25 1970

(SEAL)
Attest:

Edward M. Fletcher, Jr.
Attesting Officer

WILLIAM E. SCHUYLER, JR.
Commissioner of Patents